United States Patent [19]

Kröger et al.

[11] Patent Number: 5,289,819
[45] Date of Patent: Mar. 1, 1994

[54] DEVICE FOR OPERATING AND TESTING GAS MASKS AND BREATHING EQUIPMENT

[75] Inventors: Rainer Kröger, Krummesse; Ralf Dramenski, Elmshorm, both of Fed. Rep. of Germany

[73] Assignee: Dragerwerk AG, Lubeck, Fed. Rep. of Germany

[21] Appl. No.: 936,088

[22] Filed: Aug. 26, 1992

[30] Foreign Application Priority Data

Sep. 7, 1991 [DE] Fed. Rep. of Germany ....... 4129848

[51] Int. Cl.⁵ ................................................. G01N 19/00
[52] U.S. Cl. ............................ 128/200.24; 128/202.22; 73/40
[58] Field of Search ............ 128/200.24, 202.22, 128/201.23; 73/40, 168; 434/226, 270

[56] References Cited

U.S. PATENT DOCUMENTS

| | | | |
|---|---|---|---|
| 4,146,025 | 3/1979 | Warncke | 73/40 X |
| 4,253,328 | 3/1981 | Pasternack | 73/40.7 |
| 4,344,144 | 8/1982 | Damico | 364/413 |
| 4,765,325 | 8/1988 | Crutchfield | 128/202.13 |
| 4,796,467 | 1/1989 | Burt | 73/168 |
| 4,846,166 | 7/1989 | Willeke | 128/200.24 |
| 4,914,957 | 4/1990 | Dougherty | 73/40 |
| 5,076,965 | 12/1991 | Guelta | 252/408.1 |
| 5,080,829 | 1/1992 | Carlon | 252/408.1 |
| 5,097,697 | 3/1992 | Carnal | 73/40 |
| 5,195,896 | 3/1993 | Sweeney | 434/265 |

FOREIGN PATENT DOCUMENTS

| | | | |
|---|---|---|---|
| 698045 | 10/1940 | Fed. Rep. of Germany | 73/40 |
| 944416 | 6/1956 | Fed. Rep. of Germany | 128/200.24 |
| 3427182A1 | 1/1986 | Fed. Rep. of Germany | |
| 629933 | 10/1978 | U.S.S.R. | 128/200.24 |
| 974178 | 11/1982 | U.S.S.R. | 73/40 |

Primary Examiner—Edgar S. Burr
Assistant Examiner—Eric P. Raciti
Attorney, Agent, or Firm—McGlew and Tuttle

[57] ABSTRACT

A testing device for gas masks and breathing equipment has a head part, to which the gas mask and breathing equipment can be connected and which is connected to a testing unit simulating the respiratory activity. The testing device provides more accurate testing especially with respect to the pressure and flow conditions. Using a valve (11, 13), which interrupts the flow connection and is provided at the testing connection in close proximity, in terms of flow, of the respiration connection.

8 Claims, 1 Drawing Sheet

DEVICE FOR OPERATING AND TESTING GAS MASKS AND BREATHING EQUIPMENT

FIELD OF THE INVENTION

The present invention pertains to a device for operating and testing compressed air-operated respiratory aids which support or enable breathing, such as gas masks and breathing equipment, which can be sealingly connected via a respiration connection (mask, mouthpiece) to a head part simulating the respiratory openings of the user of the equipment, which head part is in flow connection via a testing connection with a testing unit that can be actively controlled and passively adjusted in terms of pressure generation and change in volume.

BACKGROUND OF THE INVENTION

Such a device has become known from U.S. Pat. No. 4,344,144 (corresponding to West German Offenlegungsschrift No. DE-OS 30,16,684). Via a pneumatic part, the prior-art device generates gas flows with predeterminable pressure and flow values which can occur under normal load as well as increased load of the user of the equipment. The operating parameters of the testing device thus generated are transmitted to a head part which has a testing connection, via which the equipment to be tested is operated with the driving gas pressure and volume generated. By simulating the operating parameters, it is possible to test or even monitor a breathing equipment or a gas mask and breathing equipment or even a simple respiratory aid for function capability. Such a device can also be used for developing new gas masks and breathing equipment in order to test the effects of new components or completely new series of equipment on the expected subsequent case of operation. The test results obtained can be recorded and documented by corresponding measuring points in the head part or even in the equipment to be tested itself.

With the increasing refinement of the pneumatic regulating and control units of gas masks and breathing equipment and the increasing requirements imposed in terms of compact design of the equipment and the economical use of respiratory gas that is carried with the equipment, it is necessary to ensure that the smallest possible amount of respiratory gas will be wasted during the operation of gas masks and breathing equipment. Consequently, e.g., pressure-sensitive control components are able to respond to the pressure in the respiratory tract more readily, so that low pressures and weak respiration flows must increasingly be measured during testing, and permissible deviations from the desired value increasingly become smaller. The disturbances that distort the result of the measurement must be further reduced, so that especially dead space volumes, which are filled with compressible gas, are to be avoided, and the flow conditions for the respiratory gas are to be established such that they will not exert any unfavorable effects on the pressure conditions in the lines carrying respiratory gas.

SUMMARY AND OBJECTS OF THE INVENTION

It is a primary object of the present invention to improve a device of the above-described class such that more accurate testing and more sensitive measurement of the operating parameters of gas masks and breathing equipment becomes possible, especially in the case of weak gas flows and low operating pressures in the lines carrying respiratory gas.

This object is attained by arranging a valve that interrupts the flow connection at the test connection in close proximity, in terms of flow, of the opening accommodating the breathing connection.

The advantage of the present invention is essentially the fact that the volumes tested in front of and beyond the valve are separated from one another in the flow path between the gas mask and breathing equipment to be tested or operated and the testing unit that makes operation or testing possible, so that in the case of, e.g., leakage tests of the gas mask and breathing equipment, the compressible volume beyond the valve in the direction of the testing unit does not affect the pressure properties and tightness, or leaks for which the gas mask and breathing equipment is to be tested. It is thus possible, e.g., to deliver a defined volume under a predeterminable pressure into the gas mask and breathing equipment through the testing unit in order to simulate an expiration stroke of the equipment user, after which the valve is closed, so that the gas mask and breathing equipment is disconnected from the testing unit, and leaks that may occur, or maintenance of the excess pressure generated in the gas mask and breathing equipment can be monitored by a corresponding pressure measurement in the line section between the respiration connection and the gas mask and breathing equipment. It is thus possible to check even minor leaks which would otherwise be lost without the valve in the compressible, rather substantial gas volume of the testing unit. Due to the dilatability of the materials of the testing unit that are connected, even small pressure drops, which could not be positively attributed to a leak, would be indicated, because the flexibility of the various materials used would also simulate a leak during the pressure holding phase, besides the compressibility of the gas filling. Especially the component of the testing unit which simulates the lung should be taken into consideration in this connection. A bellows with a capacity of several liters, which can be moved via a drive unit, is usually used for this purpose. Such a testing unit, which simulates and records breathing strokes both actively and passively, is described in West German Offenlegungsschrift No. DE-OS 34,27,182. The testing unit described and explained there can be considered as an example of connection to the device according to the present invention.

The valve arrangement is preferably designed such that the opening of the head part accommodating the respiration connection is in connection via an air guide canal with the tubular testing connection that forms, at its tube end, a sealing seat for the valve flap. Beginning from the opening, the canal is arranged annularly around the sealing seat. It is thus ensured that the smallest possible dead space volume is formed above the valve disk when the valve is closed, and that a flow canal that possibly encloses the entire circumference of the valve seat is formed when the valve is open in order to permit flow through the testing connection with the least amount of hindrance possible.

The valve plate is preferably actuated via a closing device. In the simplest case, this may consist of a manually operated lever which is able to place the valve disk axially movably onto the valve seat via a tappet.

Automatic operation of the valve is made possible by the use of a piston-and-cylinder unit as a closing device, on whose piston rod the valve disk can be placed, axially movably, over the valve seat, so that short closing and opening paths can be achieved. The piston-and-cylinder unit is supplied with compressed air via a pneumatic connection, and the piston is pre-tensioned in the direction of valve opening by a spring, and an excess pressure of about 4 bar is generated in the pressure chamber behind the cylinder disk for closing the valve. To improve the flow properties, it is advantageous to arrange the connection radially in relation to the testing connection at the level of the valve seat, as a result of which the dead space is further reduced when the valve is closed.

Since tight seating of the respiration connection on the device according to the present invention is significant, and since full masks and half-masks are also considered to be respiration connections, the head part is to be made of a rigidly flexible, elastic cover at least in the area of the respiratory openings. As a result of this, if a full mask or a half-mask is used as the respiration connection, the harness can be tightened so much that plastic fitting of the mask contours to the surface of the dummy human head part can be achieved, so that the best possible tightness can be achieved in the peripheral zone of the protective mask.

To make it possible to measure and record the pressure occurring in the respiration connection, it is necessary to attach a pressure-measuring connection. It should preferably be arranged on a hollow ring that surrounds the respiratory opening accommodating the respiration connection and is in pressure connection with the respiratory opening via a plurality of holes. The pressure-measuring connection is connected to a pressure sensor outside the testing device via a flexible tube. To avoid turbulence, the holes in the respiration connection shall not overlap the opening for the pressure-measuring connection. The pressure-measuring connection is used to test the opening pressure of a connected respirator during the simulation of breathing.

Another measuring connection can be provided at the level of the eye-nose area of the head part. It is used to measure the pressure inside the mask when the breathing mask has been put in place if the sealing function of the mask is to be checked. At the same time, the measuring connection may also be used to put inside of the mask under vacuum (10 mbar) if it is designed in the form of a flexible tube connection that only has to transmit the pressure pneumatically to a downstream pressure sensor. As an alternative, the measuring connection may contain the pressure sensor both at the respiration connection and in the eye-nose area, so that electric sensor lines that may be necessary can be led out from the connections.

It is a further object of the invention to provide a device for operating and testing gas masks and breathing equipment, which device is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
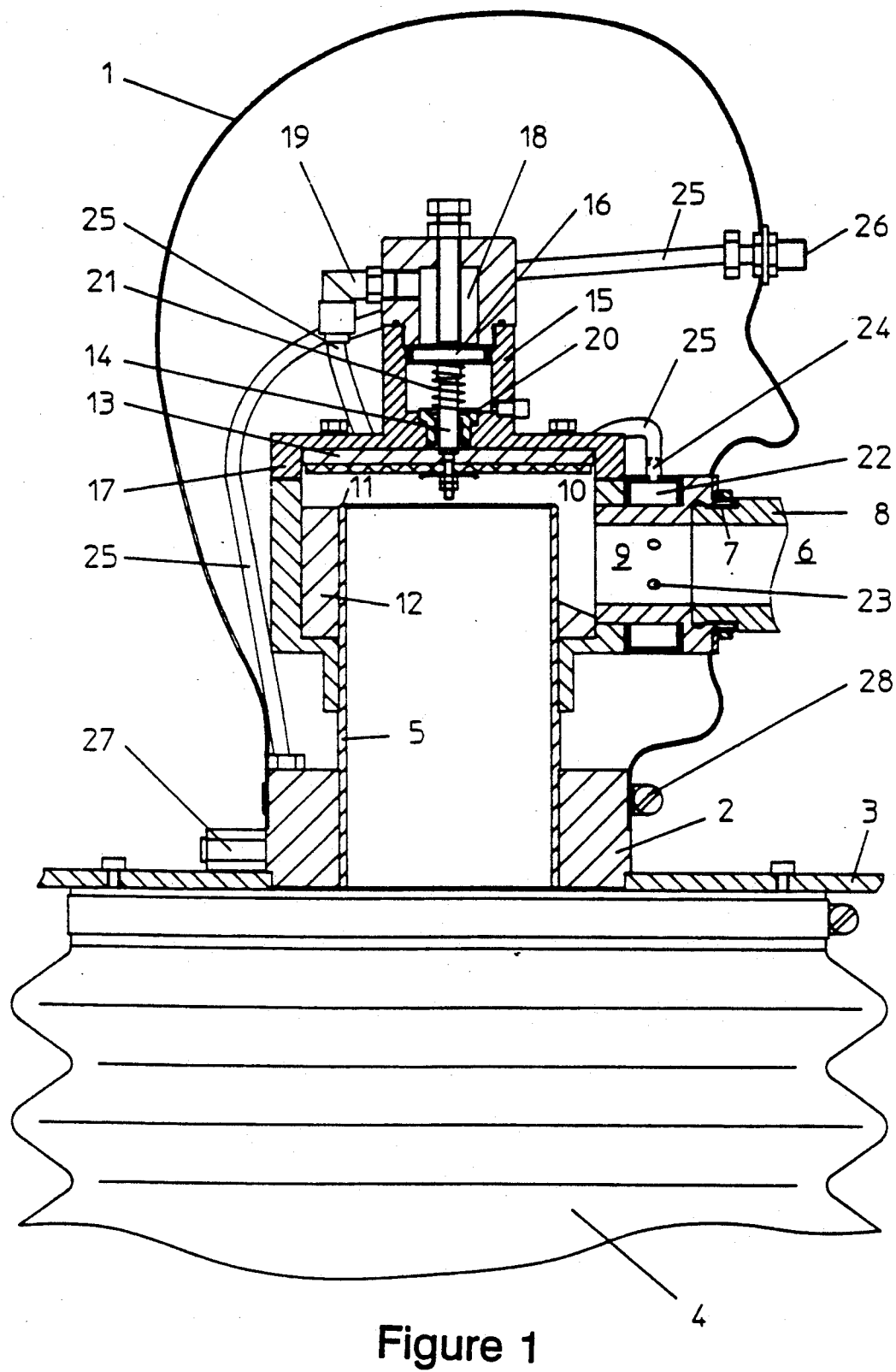
FIG. 1 is a cross-sectional substantially schematic representation of a device for operating and testing gas masks and breathing equipment according to the invention.

The only FIGURE shows a dummy human head part 1 in the form of a firm elastic cover, which is clamped via clamping element 28 onto a fastening block 2 of a base plate 3 of a testing unit 4. The testing unit 4 is represented only symbolically by a rubber bellows, which is shown in, e.g., West German Offenlegungsschrift No. DE-OS 34,27,182 and is described in connection with a complete testing unit. A testing connection 5 in the form of a tube is provided. Testing connection 5 is in flow connection with the testing unit 4, on the one hand, and with a respiration connection 6, on the other hand, is accommodated on the base plate 3 in the fastening block 2. The respiration connection 6 is shown symbolically as a threaded insert 7 with the respiration tube 8 pulled over it. The respiration tube 8 symbolizes a complete, compressed air-operated gas mask and breathing equipment, not shown, which is attached to the head of the user of the equipment via a full mask during actual use. An opening 9 accommodates the respiration connection 6 and represents the mouth of an equipment user. The opening 9 is extended in an air guide canal 10, which annularly surrounds the end of the testing connection 5, which end is designed as a sealing lip 11. The air guide canal 10 is formed by the recesses of a sleeve 12 arranged around the testing connection 5. The sealing lip 11 can be closed via a valve disk 13, which is attached to a piston rod 14, which is part of a piston 16 that is axially displaceable in a cylinder 15. The cylinder 15 is connected to the connection cover 17 to form one unit with it, and has a pressure chamber 18, which can be connected to a compressed gas source, not shown, via a compressed air connection 19. A compression spring 21, which pre-tensions the valve disk 13 in the direction of opening, is held between the piston 16 and the guide 20 for the piston rod 14. To measure the pressure in the opening 9 or the respiration connection 6, an annular canal 22, whose interior space communicates with the opening 9 via a plurality of holes, is arranged around the opening 9. A pressure-measuring connection 24 on the annular canal 22 is provided for measuring the pressure in the respiration connection 6, which can be connected to a pressure sensor, not shown, via a nozzle line 25. A measuring connection 26 for pressure measurement inside a full breathing mask (not shown) pulled over the dummy human head part 1 is also arranged in the eye-nose area of the dummy head part 1 in the same manner. Both the compressed air connection 19 and the pressure connection 24 and the measuring connection 26 are led out of the interior of the dummy human head part 1 via nozzle line 25 to a flexible tube connection 27, where they can be connected either to a compressed air source or, as an alternative or simultaneously, to a pressure sensor. Neither the compressed air source nor the pressure sensor is shown.

To carry out testing, the testing unit 4 is actuated, with the valve disk 13 open, e.g., such that the decreasing volume of the bellows 4 will generate, when the gas mask and breathing equipment is connected, an excess pressure in both the testing connection 5 and the air guide canal 10, as well as in the respiration connection 6 if it is ensured that the valves necessary for controlling the respiratory gas in the gas mask and breathing equipment are closed. To check the tightness of the gas mask and breathing equipment connected, the valve 11, 13 is closed—after the necessary excess pressure has been generated—by sending a corresponding signal from the testing unit 4 to the compressed air connection 19, and the pressure in the respiration connection is measured via the pressure-measuring connection 24 and the nozzle 25 by means of the pressure sensor, not shown. If the pressure measured does not change within a predetermined period of time by more than a specific amount, the gas mask and breathing equipment connected can be assumed to be tight. Due to the fact that the valve 11, 13 is closed during the leakage testing, the entire test volume enclosed by the testing connection 5 and the testing unit 4 is excluded from the leakage testing. As a result, the test volume filled with compressible gas is considerably reduced, and the test result can be limited exclusively to the test object.

In another case, not shown, a full mask can be considered to be the respiration connection; this full mask is pulled over the contours of the head part 1, so that the nose and mouth area of the dummy human head part 1 is covered and tight contact of the sealing edge of the mask is ensured by tightly drawing the harness. The sealing function of the mask edge is tested by drawing off the air from the inside of the interior space of the mask through the nozzle 25 connected via the measuring connection 26 to the extent that a vacuum of about 10 mbar will become established. The pressure sensor (not shown) connected in the line section of the extended nozzle 25 monitors the amount of a possible deviation from the 10-mbar value set initially for about 60 sec. It this value does not exceed a predeterminable limit value, the mask can be considered to be in tight contact with the dummy human head part 1.

While a specific embodiment of the invention has been shown and described in detail to illustrate the application of the principles of the invention, it will be understood that the invention may be embodied otherwise without departing from such principles.

What is claimed is:

1. A device for operating and testing compressed air-operated respiratory devices connectable to the head of a human, the device comprising:

a dummy human head part including means including a respiration connection for simulating the respiratory openings of an equipment use said dummy human having a surface providing a sealing connection between said dummy human head and a gas mask;

a test connection tube at least partially extending into said dummy human head, in flow connection with said respiratory opening;

a testing unit for supplying fluid, said testing unit being in fluid connection with said test connection tube, said testing unit being actively controlled and passively adjusted in terms of pressure generation and change in volume; and valve means for interrupting fluid flow from said test connection to said respiratory opening, said valve means being positioned in flow communication between said respiratory opening of said dummy human head part and said test connection tube.

2. A device for operating and testing compressed air-operated respiratory devices connectable to the head of a human, the device comprising:

a dummy human head part including means including a respiration connection for simulating the respiratory openings of an equipment use;

a test connection tube in flow connection with said respiratory opening;

a testing unit for supplying fluid, said testing unit being in fluid connection with said test connection tube, said testing unit being actively controlled and passively adjusted in terms of pressure generation and change in volume; and valve means for interrupting fluid flow from said test connection, said valve means being positioned in flow communication between said respiratory opening of said dummy human head part and said test connection tube.

3. A device according to claim 2, wherein said opening of said dummy human head part accommodates a respiration connection, said test connection tube, forming a sealing seat at an end; said valve means including said sealing seat and a valve flap, an air guide canal being arranged annularly around said sealing seat and being in fluid connection with said respiratory opening, thereby providing a large as possible flow cross section for said valve while maintaining a small flow volume.

4. A device according to claim 2, wherein said valve means includes a valve disk arranged above a valve seat formed at an end of said test connection tube, closing means being provided connected to said valve disk for axial movement of said valve disk above said valve seat, said closing means being connected to said valve disk via a tappet, said respiratory opening being arranged radially with respect to said test connection tube at a level of said valve seat, thereby forming a fluid connection with a minimum dead space when said valve is closed.

5. A device according to claim 4, wherein said closing means includes a pneumatically actuated piston-and-cylinder unit including said tappet, said tappet forming a piston rod attached to said valve disk.

6. A device according to claim 2, wherein said dummy human head part is formed of an elastic cover in a region surrounding said respiratory openings.

7. A device according to claim 2, further comprising a pressure sensor connected to a hollow ring, said hollow ring surrounding a circumference of said respiratory opening, a pressure connection being provided through a hole in said respiratory opening, for measuring pressure of said respiratory opening at a remote location.

8. A device according to claim 6, wherein said dummy human head part has an eye-nose area at an eye-nose area level, said pressure sensor is connected to a measuring connection, said measuring connection projecting from said dummy human head part at said eye-nose area level, said measuring connection being in pneumatic pressure connection with surroundings of said dummy human head part.

* * * * *